(12) United States Patent
Carimalo et al.

(10) Patent No.: US 7,540,610 B2
(45) Date of Patent: Jun. 2, 2009

(54) OPHTHALMIC LENS

(75) Inventors: Céline Carimalo, Singapore (SG); Bénédicte Deldalle, Servon (FR)

(73) Assignee: Essilor International (Compagnie Generale d'Optique), Charenton Cedex (FR)

( * ) Notice: Subject to any disclaimer, the term of this patent is extended or adjusted under 35 U.S.C. 154(b) by 54 days.

(21) Appl. No.: 11/569,928

(22) PCT Filed: May 31, 2005

(86) PCT No.: PCT/FR2005/001328

§ 371 (c)(1), (2), (4) Date: Dec. 12, 2007

(87) PCT Pub. No.: WO2006/003275

PCT Pub. Date: Jan. 12, 2006

(65) Prior Publication Data

US 2008/0246914 A1   Oct. 9, 2008

(30) Foreign Application Priority Data

Jun. 4, 2004   (FR) .................................. 04 06068

(51) Int. Cl.
*G02C 7/02* (2006.01)
(52) U.S. Cl. ...................................... 351/175; 351/173
(58) Field of Classification Search ................. 351/159, 351/173, 175
See application file for complete search history.

(56) References Cited

U.S. PATENT DOCUMENTS

| | | | |
|---|---|---|---|
| 2,878,721 A | 3/1959 | Kanolt | |
| 4,253,747 A | 3/1981 | Maitenaz | |
| 4,854,689 A | 8/1989 | Dufour et al. | |
| 6,116,734 A | 9/2000 | Pedrono et al. | |
| 6,382,789 B1 | 5/2002 | Baudart et al. | |
| 7,216,977 B2 * | 5/2007 | Poulain et al. | 351/169 |

FOREIGN PATENT DOCUMENTS

| | | |
|---|---|---|
| FR | 2769997 | 4/1999 |
| FR | 2783938 | 3/2000 |
| WO | WO03/058407 | 3/2003 |

OTHER PUBLICATIONS

Kah Meng Chung, Eileen Chong, "Near esophoria is associated with high myopia," Clinical and Experimental Optometry, vol. 83, No. 2, pp. 71-75 (2000).

* cited by examiner

*Primary Examiner*—Scott J Sugarman
(74) *Attorney, Agent, or Firm*—Fish & Richardson P.C.

(57) ABSTRACT

The invention concerns an ophthalmic lens having a complex surface, with a substantially umbilical meridian and an average sphere progression ranging between 0.50 diopter and 0.75 diopter. The lens is prescribed for esophoric and non-presbyopic users. The lens is prescribed as a standard unifocal lens. Through the presence of the average sphere progression, the user is less adapted to near vision, thus compensating for his/her esophoria.

11 Claims, 8 Drawing Sheets

OPHTHALMIC LENS

CROSS-REFERENCE TO RELATED APPLICATIONS

This application is a phase application under 35 U.S.C. § 371 of PCT International Application No. PCT/FR2005/001328, filed May 31, 2005, which claims priority to French Application Serial No. 0406068, filed Jun. 4, 2004.

The subject of the present invention is an ophthalmic lens.

Any ophthalmic lens intended to be held in a frame involves a prescription. The ophthalmic prescription can include a positive or negative power prescription as well as an astigmatism prescription. These prescriptions correspond to corrections enabling the wearer of the lenses to correct defects of his vision. A lens is fitted in the frame in accordance with the prescription and with the position of the wearer's eyes relative to the frame.

In the simplest cases, the prescription is nothing more than a power prescription. The lens is said to be unifocal and has an axis of symmetry. It is fitted in a simple manner in the frame so that the principal direction of viewing of the wearer coincides with the axis of symmetry of the lens.

For presbyopic wearers, the value of the power correction is different for far vision and near vision, due to the difficulties of accommodation in near vision. The prescription thus comprises a far-vision power value and an addition (or power progression) representing the power increment between far vision and near vision; this comes down to a far-vision power prescription and a near-vision power prescription. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642 FR-A-2 699 294 or also FR-A-2 704 327. They are generally determined by optimization, based on a certain number of constraints imposed on the different characteristics of the lens. These lenses are all-purpose lenses in that they are adapted to the different needs of the wearer at the time.

For young presbyopics, lenses have been proposed which do not have a far-vision zone with a reference point, unlike standard progressive multifocal lenses; these lenses are described in FR-A-2 588 973. These lenses are prescribed only in accordance with the power required by the wearer in near vision, regardless of the power required by the wearer in far vision. The lens has a central part which has an additional spherical power offering the wearer satisfactory near vision. It also has a slight decrease in power in the upper part, which gives the wearer clear vision even beyond the normal near-vision field. Finally, the lens has a point with a power value equal to the nominal near-vision power, a higher-power zone in the lower part of the lens and a lower-power zone in the upper part of the lens.

FR-A-2 769 997 proposes a lens which, compared with a standard progressive multifocal lens, has a stabilized and larger near-vision zone, a significant increase in the field widths in near vision and intermediate vision, as well as a reduction in the aberrations and in particular of astigmatism. It provides a suitable correction for distances between 40 and 80 cm and, in most cases, for distances between 40 cm and 2 m. This lens is actually a near-vision—intermediate-vision mid-distance lens, favouring near vision while providing clear vision beyond the normal near-vision field. On the other hand, no far vision is available. This lens solution proves particularly well suited to computer work. It is prescribed for young presbyopics, solely in accordance with the prescription for near vision. The rear face of the lens is machined in order to provide a near-vision power matching the prescription, without taking account of the far vision prescription. Two front faces are sufficient to meet all of the wearer's needs.

Multifocal lenses, whether they are progressive or intended purely for near vision, can include a complex multifocal face (i.e. assuming no axis of revolution, typically a surface having a power progression), for example the face facing the person wearing the glasses, and a spherical or toric face, called prescription face. This spherical or toric face allows the lens to be adapted to the user's ametropia, so that a multifocal lens is generally defined only by its complex surface. For a given product different complex faces are defined in accordance with the addition and the base (or mean far-vision sphere). Starting from semi-finished lenses, of which only the multifocal face is formed, it is possible to prepare lenses suited to each wearer, by simple machining of a spherical or toric prescription face.

Independently of the power prescription, a wearer may be given an astigmatism prescription. Such a prescription is produced by the ophthalmologist in far vision in the form of a pair formed by an axis value (in degrees) and an amplitude value (in diopters). On a surface, the amplitude value represents the difference $1/R_1 - 1/R_2$ between the principal curvatures; the axis value represents the orientation, relative to a reference axis and in a conventional direction of rotation, of the maximum curvature $1/R_1$. In prescription terms, the amplitude value represents the difference between the minimum and maximum powers in a given direction and the axis represents the orientation of the maximum power. The term astigmatism is used for the pair (amplitude, angle); this term is also sometimes used, although this is linguistically incorrect, for the amplitude of the astigmatism. The context allows a person skilled in the art to understand which meaning is intended.

FR-A-1 152 388 describes trifocal lenses; compared with standard bifocal lenses, the lens is provided with an upper focus, symmetrical with the lower focus. This focus is suitable for seeing normally, in near vision, objects placed above the eyes. Russell L. Stimson, *Ophthalmic Dispensing*, Whiting Press Incorporated, Rochester Minn., 1951, proposes on pages 285-293 vocational lenses: these lenses are dedicated to specific occupations and provide correct vision at points different from the reference points for far vision and for near vision of conventional bifocal lenses. In particular it is again suggested to use a focus in the top part of the lens.

The invention proposes a lens suited to esophoric, non-presbyopic, ametropic wearers who experience eyestrain when using their near vision over a prolonged period. The lens of the invention can be easily prescribed, fitted in a simple manner and provides wearers with a good correction; it limits the eyestrain that these wearers may feel due to a prolonged use of their near vision—for example, for prolonged periods of reading or on the computer.

The invention thus proposes, in one embodiment, an ophthalmic lens, having a prescription for esophoric and non-presbyopic wearers and a complex surface with:

a substantially umbilic meridian, a mean-sphere progression greater than or equal to 0.50 diopters and less than 0.75 diopters.

The lens can also have one or more of the following characteristics:

it has a progression length less than or equal to 11 mm, the progression length being defined as the height on the lens between the optical centre and the point on the meridian at which the mean sphere is greater than 85% of the progression to the mean sphere at the optical centre;

it has a maximum mean sphere at a point on the lens corresponding to a 26° lowering of viewing under wearing conditions, relative to the direction of viewing passing through the optical centre;

the meridian is rectilinear; in this case, the complex surface is preferably symmetrical relative to the meridian;

the complex surface has a second axis of symmetry perpendicular to the meridian;

the lens has a substantially constant mean sphere on the meridian above the optical centre;

the lens has a substantially constant mean sphere on the meridian below the maximum mean sphere point of the meridian.

The invention also proposes a visual device comprising at least one such lens.

The invention also proposes a method for compensating for esophoria exploiting the accommodation-convergence relationship by relaxing the accommodation of a non-presbyopic subject, which comprises providing the subject with, or the wearing by the subject of, such a device.

Finally, the invention proposes a method for fitting such a lens in a visual device, comprising measuring the position in the device of the subject's viewing in far vision, and fitting of a lens in the device, with the optical centre at the measured position.

Other advantages and characteristics of the invention will become apparent on reading the following description of embodiments of the invention, given by way of example and with reference to the drawings which show.

In the rest of the description, for the sake of simplicity of the disclosure, the case of a lens having one complex surface and one spherical or toric surface is considered. In this context, complex surface refers to any surface not allowing an axis of revolution, typically a surface having a power progression. The complex face of the lens can be the front face (remote from the wearer), as is the case for progressive multifocal lenses of the state of the art, or the rear face (directed towards the wearer). In this case, a complex surface is usually characterized by mean-sphere and cylinder values, defined below, at any point.

Figure 1:
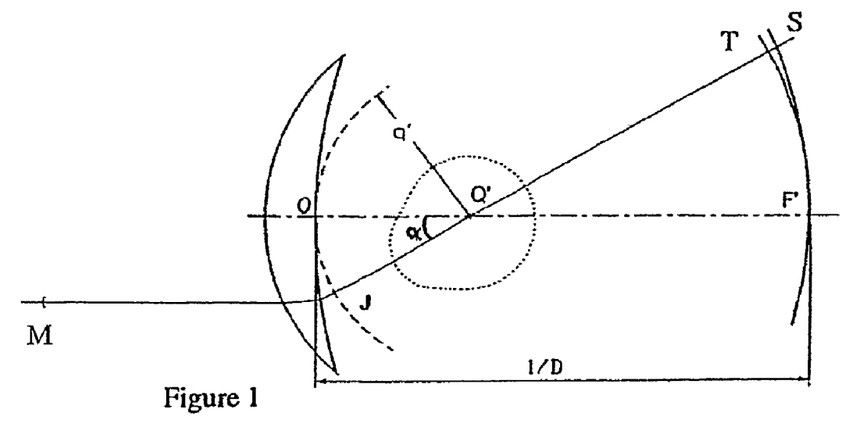
FIG. 1, a diagrammatic representation of an eye-lens system, in a top view.
Figure 2:
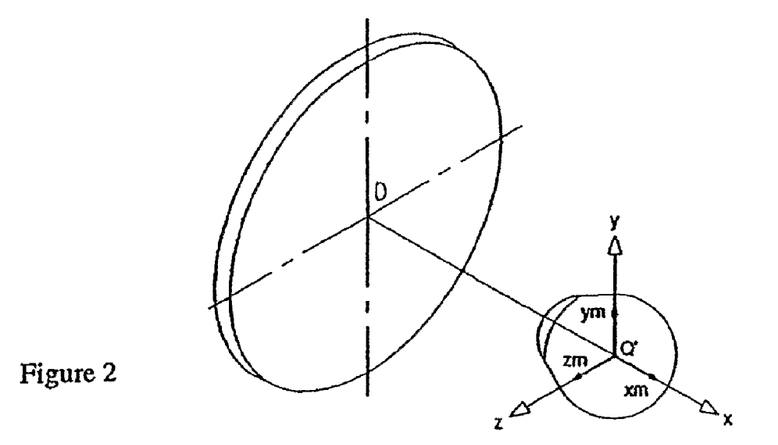
FIGS. 2 and 3, perspective diagrams of an eye-lens system.
Figure 3:
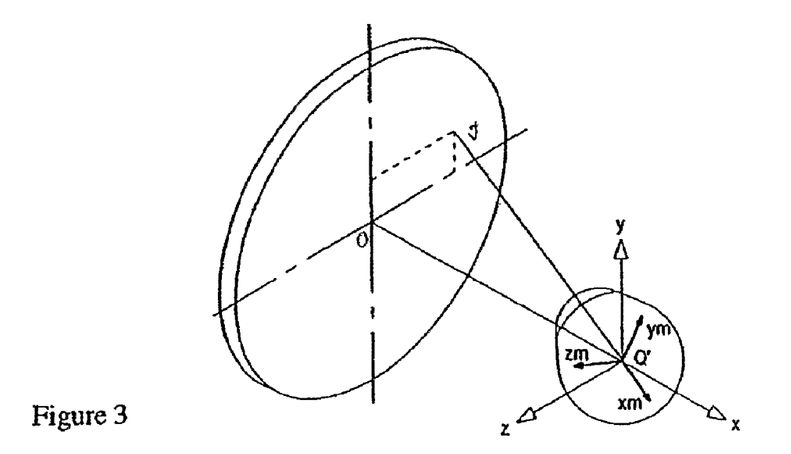

In as far as the invention can also apply to other types of lenses—for example lenses having two complex faces, optical definitions of power and astigmatism are given with reference to FIGS. 1 to 3.

In the following, the terms top and bottom, horizontal or vertical are used relative to the position of the lens in a frame unless otherwise stated.

In a manner known per se, at any point of a complex surface, a mean sphere D given by the formula:

$$D = \frac{n-1}{2}\left(\frac{1}{R_1} + \frac{1}{R_2}\right)$$

is defined, where $R_1$ and $R_2$ are the maximum and minimum curvature radii expressed in meters, and n is the index of the material constituting the lens.

A cylinder C, given by the formula:

$$C = (n-1)\left|\frac{1}{R_1} - \frac{1}{R_2}\right|,$$

is thus defined.

The norm of the cylinder gradient vector is also known as the cylinder slope. This definition is independent of the reference point used, but can be written, at an orthonormalized reference point:

$$\|\overline{gradC}\| = \sqrt{\left(\frac{\partial C}{\partial x}\right)^2 + \left(\frac{\partial C}{\partial y}\right)^2}$$

The characteristics of the complex face of the lens can be expressed using the mean sphere and the cylinder.

For a given lens, the corresponding optical variables are defined, namely a power and an astigmatism, under wearing conditions. FIG. 1 shows a diagram of an eye 2 and lens 4 optical system in top view, and shows the definitions used hereafter in the description. The centre of rotation of the eye is called Q'; the axis Q'F' represented in the figure in chain-dotted lines is the horizontal axis passing through the centre of rotation of the eye and continuing in front of the wearer—in other words the axis Q'F' corresponds to the primary direction of viewing. This axis cuts, on the front face, a centring point of the lens which, for standard progressive lenses, is called the fitting cross, which is marked on the lenses in order to allow their positioning by an optician. In the progressive multifocal lenses of the state of the art described above, the geometrical centre of the front face is generally situated 4 mm below the fitting cross. Let point O be the point of intersection of the rear face and this axis Q'F'. A sphere of the vertices is defined, with a centre Q', and a radius q', which cuts the rear face of the lens at the point O. By way of example, a radius q' value of 27 mm corresponds to a current value and produces satisfactory results when the lenses are worn. The section of the lens can be drawn in the plane (O, x, y) which is defined with reference to FIG. 2. The tangent to this curve at the point O is inclined relative to the axis (O, y) at an angle called the pantoscopic angle. The value of the pantoscopic angle is generally 7 to 12°. The section of the lens can also be drawn in the plane (O, x, z). The tangent to this curve at the point O is inclined relative to the axis (O, z) at an angle called the curving contour. The value of the curving contour is currently 0°.

These conditions of fitting of the lens relative to the eye, namely:

a distance of 27 mm between the centre of rotation of the eye and the rear face of the lens, on the axis Q'F';

a pantoscopic angle of 8°;

a curving contour of 0°are hereafter called wearing conditions.

A given direction of viewing—represented in solid lines in FIG. 1—corresponds to a position of the eye in rotation about Q' and to a point J of the sphere of the vertices; a direction of viewing can also be marked, in spherical coordinates, by two angles α and β. The angle α is the angle formed between the axis Q'F' and the projection of the straight line Q'J over the horizontal plane containing the axis Q'F'; this angle appears in the diagram of FIG. 1. The angle β is the angle formed between the axis Q'F' and the projection of the straight line Q'J over the vertical plane containing the axis Q'F'. A given direction of viewing therefore corresponds to a point J of the sphere of the vertices or to a pair (α, β).

In a given direction of viewing, the image of a point M of the object space situated at a given object distance forms between two points S and T corresponding to minimum and maximum distances JT and JS (which are sagittal and tangential focal distances in the case of revolution surfaces, and of a point M at infinity). The angle γ marked as the axis of astigmatism is the angle formed by the image corresponding to the smallest distance with the axis $(z_m)$, in the plane $(z_m, y_m)$ defined with reference to FIGS. 2 and 3. The angle γ is measured in counter-clockwise direction when looking at the wearer. In the example of the figure, on the axis Q'F', the image of a point of the object space at infinity forms at the point F'; the points S and T have merged, which is another way of saying that the lens is locally spherical in the primary direction of viewing. The distance D is the rear front end of the lens.

A function linking the usual distance of the object point with each direction of viewing is called an ergorama. Typically, in far vision in the primary direction of viewing, the object point is at infinity. In near vision, in a direction substantially corresponding to an angle α of the order of 5° and to an angle β of the order of 35°, the object distance is of the order of 30 to 50 cm. For more details of a possible definition of an ergorama, FR-A-2 753 805 (U.S. Pat. No. 6,318,859) may be consulted. This document describes an ergorama, its definition and a method for its modelization. A particular ergorama consists of taking only points at infinity. For the method of the invention, points at infinity or not at infinity can be considered. The ergorama can also be a function of the ametropia of the wearer.

Using these data, a power and an astigmatism can be defined in each direction of viewing. For a direction of viewing (α, β), an object point M at an object distance given by the ergorama is considered. The points S and T between which the image of the object forms are determined. The image proximity IP is then given by $$IP = \frac{1}{2}\left(\frac{1}{JT} + \frac{1}{JS}\right)$$

while the object proximity OP is the reciprocal of the distance between the point M and the point J of the sphere of the vertices. The power is defined as the sum of the object and image proximities, i.e.

$$P = OP + IP = \frac{1}{MJ} + \frac{1}{2}\left(\frac{1}{JT} + \frac{1}{JS}\right)$$

The amplitude of the astigmatism is given by $$A = \left|\frac{1}{JT} - \frac{1}{JS}\right|$$

The angle of the astigmatism is the angle γ defined above: it is the angle measured at a reference point linked to the eye, relative to the direction $z_m$, with which the image S forms, in the plane $(z_m, y_m)$. These definitions of power and of astigmatism are optical definitions, under wearing conditions and at a reference point linked to the eye. Qualitatively, the thus-defined power and astigmatism correspond to the characteristics of a thin lens, which, fitted instead of the lens in the direction of viewing, provides the same images locally. It is noted that, in the primary direction of viewing, the definition provides the standard value of the astigmatism.

The thus-defined power and astigmatism can be experimentally measured on the lens using a frontofocometer; they can also be calculated by ray tracing under conditions when being worn.

FIGS. 2 and 3 show perspective diagrams of an eye-lens system. FIG. 2 shows the position of the eye and of the reference point linked to the eye, in the principal direction of viewing, α=β=0, called the primary direction of viewing. The points J and O have thus merged. FIG. 3 shows the position of the eye and of the reference point which is linked to it in one direction (α, β). In FIGS. 2 and 3 a fixed reference frame {x, y, z} and a reference frame $\{x_m, y_m, z_m\}$ linked to the eye are represented, in order to show the rotation of the eye clearly. The origin of the reference frame {x, y, z} is the point Q'; the x axis is the axis Q'F'—the point F' not being represented in FIGS. 2 and 3 and passes through the point O; this axis is orientated from the lens towards the eye corresponding to the direction of measurement of the axis of astigmatism. The plane {y, z} is the vertical plane: the y axis is vertical and orientated upwards; the z axis is horizontal, the reference frame being directly orthonormalized. The reference frame $\{x_m, y_m, z_m\}$ linked to the eye has the point Q' as its centre; the axis $x_m$ is given by the direction JQ' of viewing, and coincides with the reference frame {x, y, z} for the primary direction of viewing. Listing's law gives the relationships between the reference frames {x, y, z} and $\{x_m, y_m, z_m\}$, for each direction of viewing, see Legrand, *Optique Physioiogique,* Volume 1, Edition de la Revue d'Optique, Paris 1965.

Figure 4:
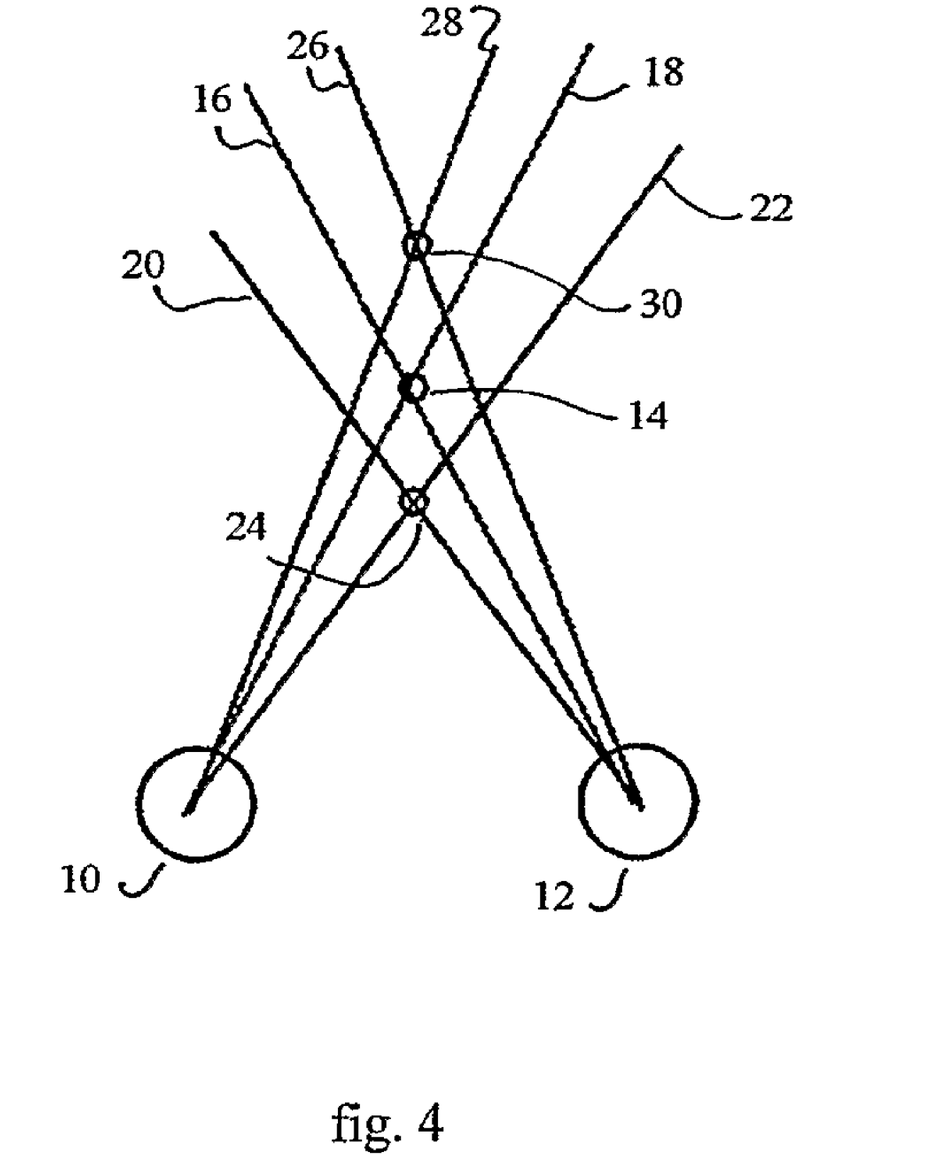
FIG. 4, a diagram of the directions of viewing for normal wearers displaying a phoria.

FIG. 4 shows a diagram of the directions of viewing for normal subjects displaying a phoria. The figure shows a schematic top view, in a horizontal plane containing the centres of rotation of the two eyes 10 and 12. FIG. 4 also shows a point 14 which is the fixation point, at which the wearer is looking. When the wearer looks at the point 14, the direction of viewing—or visual axis—passes, for each eye, through the fixation point 14; in the figure the half-lines 16 and 18 thus represent the directions of viewing for each eye; these two half-lines intersect at the fixation point.

A wearer can display a heterophoria or a phoria, i.e. a deviation of the two visual axes relative to the fixation point when binocular vision is dissociated. Phoria is shown by a modification of the visual axes when binocular vision is dissociated. In other words, in the active position—with a binocular vision—the visual axes intersect at the fixation point; in the passive position, in the absence of fission stimulus or by eliminating any fusional and peripheral stimulation, the visual axes no longer pass through the fixation point. For more details on the definition of phoria, Darras C, *Eléments and réflexions d'optique physiologique,* Edition ERA, 1995, may be consulted.

A wearer is said to be esophoric when the visual axes tend to converge too much, i.e. to converge below the fixation point. The half-lines 20 and 22 in FIG. 4 show the directions of viewing for an esophoric wearer, for the same fixation point 14; these half-lines 20 and 22 intersect at a point 24, which is closer to the wearer than the point 14. Conversely, a wearer is said to be exophoric when he tends not to converge sufficiently, or to converge beyond the fixation point. The half-lines 26 and 28 in FIG. 4 show the directions of viewing for an exophoric wearer looking at the fixation point 14; these half-lines 26 and 28 intersect at a point 30, which is further away from the wearer than the point 14. A wearer can be affected by a phoria independently of his ametropia; the phoric condition is therefore always considered for an optimum correction in far vision.

In general, the phoria is naturally compensated for by the wearer, in binocular vision. This compensation may require an effort. This effort to compensate for the phoria can be the cause of eyestrain.

The invention proposes a lens suited to esophoric and non-presbyopic ametropic wearers. The lens has a power progression between the top and the bottom of the lens. It is prescribed as a normal unifocal lens, in accordance with the wearer's prescription. The downward power progression of the lens provides the wearer with a power correction greater than the prescription, when the wearer looks through the bottom of the lens—in other words, in near vision. This power collection modifies the binocular condition of the wearer and causes him to accommodate less in near vision; because of the accommodation-convergence relationship the wearer converges less. The esophoria is thus partially compensated for by the power correction provided by the lenses, decreasing or easing the wearer's eyestrain. It is understood that this correction in the lower part of the lens does not result in a correction of the wearer's esophoria, but merely compensates for it, so as to avoid a visual correction of the wearer's esophoria.

The power progression provided by the lens is small enough not to disturb the vision of the wearer—who is not presbyopic: an upper limit of 0.75 diopters for the value of the progression is appropriate. The power progression is large enough to have an effect on the subject's convergence; a lower limit of 0.5 diopters for the value of the progression is appropriate.

The lens is described in the following with reference to two embodiments. A first embodiment of the invention is described with reference to FIGS. 5 to 7. In this example, the lens is symmetrical relative to a horizontal axis and relative to a vertical axis. A second embodiment is described with reference to FIGS. 8 to 10; in this example, the lens is symmetrical only relative to a vertical axis. The two examples proposed are examples defined by their surface parameters, in which the lens has a complex surface and a spherical or tone surface. The invention also applies to lenses having two complex surfaces. In both cases, the lens has a mean sphere progression on the meridian of the order of 0.6 diopters; this value is comprised in the range of [0.50; 0.75] diopters proposed above.

In the two embodiments described below, the lens is substantially symmetrical and the vertical axis of the lens is an umbilic line, on which the astigmatism is nil. This allows the same lens to be used for the right eye and for the left eye. The lens can be fitted in the frame keeping the axis of symmetry vertical; in fact, the progression on the lens is small enough to allow the lens to be fitted like an aspherical unifocal lens. It remains possible to envisage a fitting with an inclined umbilic line.

The centring point of the lens, considered below, often merges with the geometrical centre of the lens before trimming. More generally, the centring point can be defined in one of the following ways:
- the point situated on the lens in the middle of the two marks;
- the point showing the prism prescribed for the wearer in far vision ("optical centre");
- the point produced on the lens, before fitting in the frame, by a cross or any other mark such as a point surrounded by a circle traced on the lens;
- the point used by opticians in order to position the lens in the frame.

In practice, these definitions cover the same point of the lens. As explained below, this point is advantageously used for the fitting of the lens in the frame.

Figure 5:
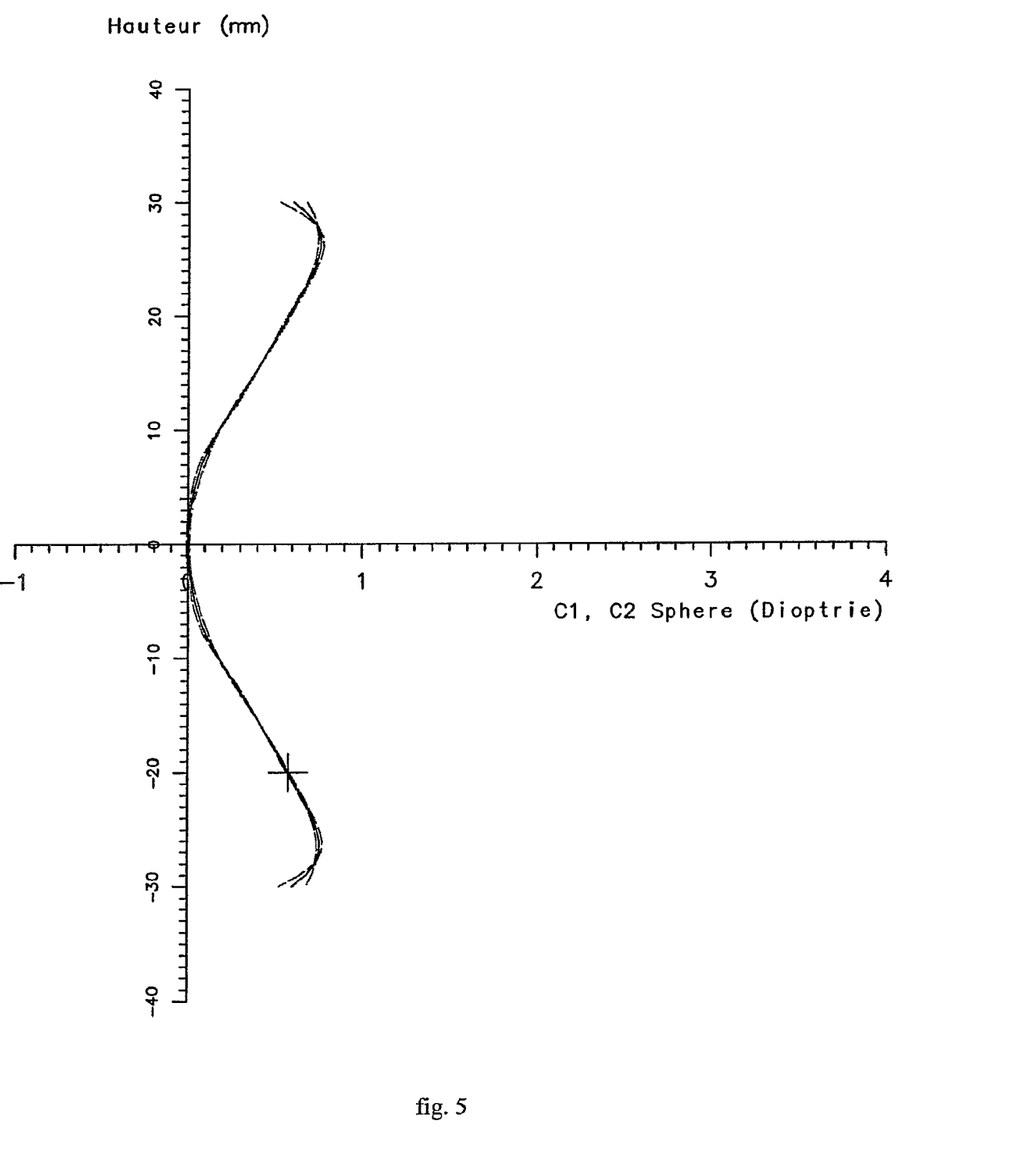
FIG. 5, a diagram of the principal curvatures and of the sphere on the axis of a lens according to a first embodiment of the invention.

FIG. 5 shows a diagram of the principal curvatures and of the sphere on the axis of a lens according to the first embodiment of the invention. The points on the complex surface of the lens are plotted on FIG. 5—and on FIGS. 6 to 10—relative to an orthonormalized reference frame, the centre of which is superposed on the centre of the lens, the ordinates axis of which is vertical and the abscissa axis is horizontal. In other words, the axis of symmetry of the lens is the ordinates axis. In FIG. 5 the curvature or the sphere is plotted on the abscissa axis in diopters; the position on the lens is marked on the ordinates axis in millimeters.

FIG. 5 shows the sphere as a solid line and, in broken lines, the principal curvatures $1/R_1$ and $1/R_2$. The values are normalized to the origin, where the mean sphere is actually equal to 4.74 diopters. It is seen firstly that the solid line and the broken lines virtually merge—which is characteristic of a cylinder which is nil or very small on the axis of the lens. In the example, the cylinder is equal to 0.04 diopters at the origin and has along the axis a value less than or equal to 0.03 diopters. In this case the axis constitutes a substantially umbilic meridian. The figure also shows also that the mean sphere increases, when moving away from the origin, reaching values of the order of 0.75 diopters for values of y of the order of ±26.5 mm. The sphere progression along the meridian is substantially linear, for absolute ordinates values of 10 to 25 mm. For the ordinates values less than 10 mm in absolute value, the sphere remains below 0.19 diopters. The figure shows the centring point, which is merged with the geometrical centre of the lens, at which the mean sphere equals 4.74 diopters. The figure also shows the reference point for near vision, at a −20 mm ordinate for which the mean sphere equals 5.29 diopters.

Figure 6:
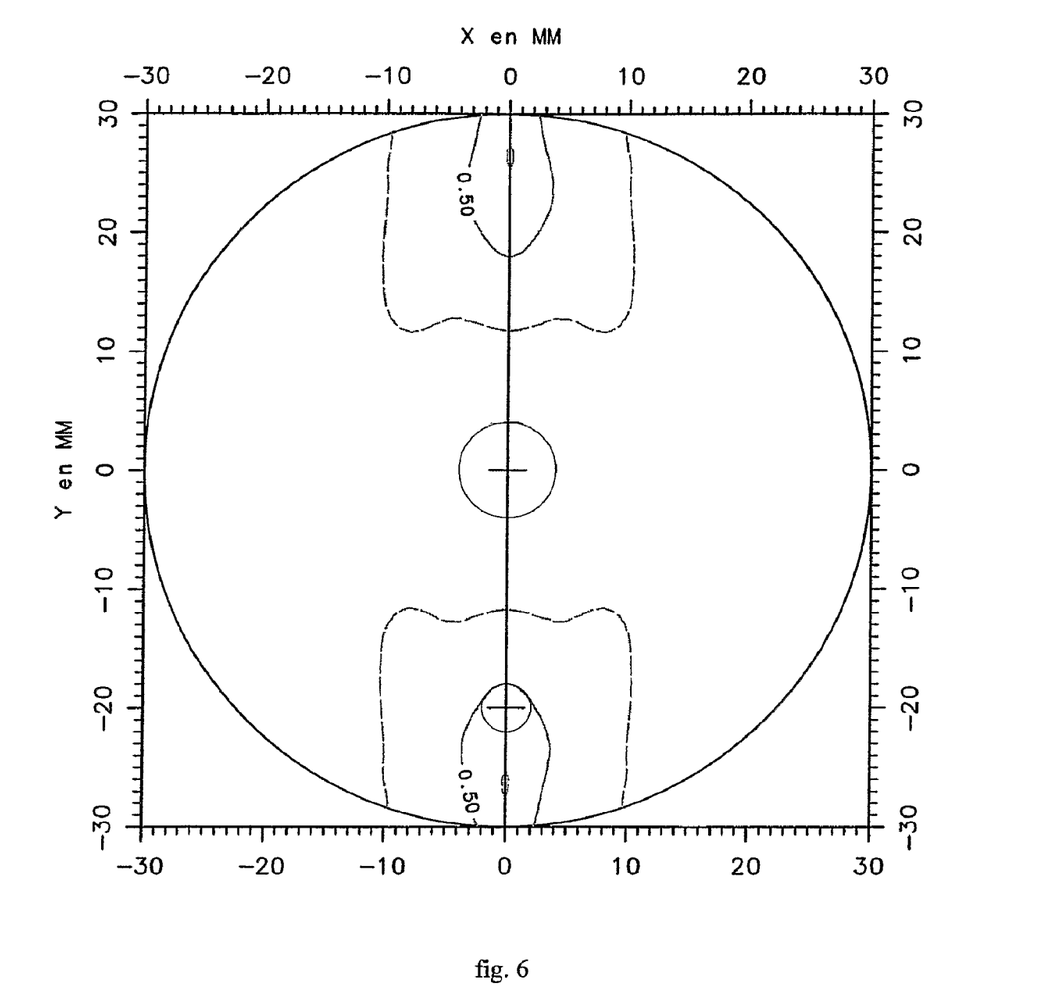
FIG. 6, a mean-sphere map of the lens of FIG. 5.

FIG. 6 shows a mean-sphere map of the lens of FIG. 5; as is customary, the isosphere lines are plotted in FIG. 6 in an orthonormalized reference; these lines are formed from the points having the same value of the mean sphere. In FIG. 6 the 0.25 diopter, 0.50 diopter, 0.75 diopter isosphere lines are represented. FIG. 6 also shows circles in fine lines around the centring point and around the reference point for near vision; these circles also appear in FIGS. 7, 9 and 10. The figure shows that the sphere progression takes place in the upper part and in the lower part of the lens, for ordinates with an absolute value greater than 10 mm and for abscissae with an absolute value less than 10 mm. The sphere is less than 0.25 diopters on every axis of the abscissae.

Figure 7:
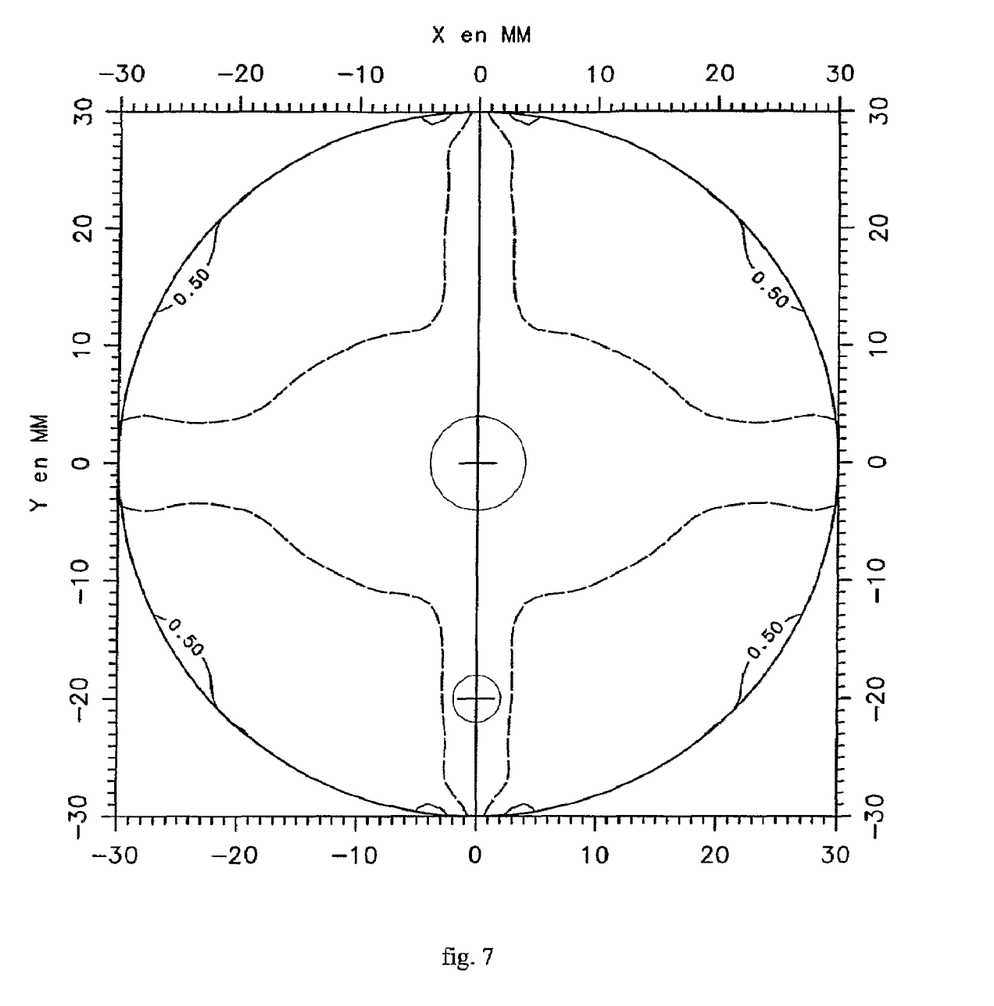
FIG. 7, a cylinder map of the lens of FIG. 5.

FIG. 7 shows a cylinder map of the lens of FIG. 5. The 0.25 diopter and 0.50 diopter isocylinder lines are represented in the figure. These lines are symmetrical relative to the vertical axis of the lens and relative to the horizontal axis of the lens. The central part of the lens therefore has a zone in which the cylinder is less than 0.25 diopters; the cylinder is less than or equal to 0.50 diopters in the outside quadrants of the lens.

The lens of FIGS. 5 to 7 is fitted in the following manner. In a manner known per se, the position in the frame of the pupil of the wearer is measured in far vision, in height and in interpupillary half-distance. The lens is then fitted in the frame in such a way that the geometrical centre is situated at the measured position; as indicated above, this means that the centring point is merged with the geometrical centre of the lens. In other words, the lens is not fitted in the frame like a progressive lens of the state of the art, with a fitting cross 4 mm above the origin. During the fitting, the upper part of the lens is trimmed, in such a way that the correction provided for the wearer in the upper part of the lens substantially corresponds to the correction by a unifocal lens of prescribed power. In the lower part of the lens, the power correction provided for the wearer reaches 0.55 or 0.60 diopters in the zone of the lens which corresponds to near vision under wearing conditions. The wearer therefore has a correction which is slightly greater than required, which makes it possible to ease the esophoria, as stated above.

The advantage of a symmetry relative to a horizontal axis, as in the example of FIGS. 5 to 7, is to avoid airy mistake during the trimming of the lens, at around 180°, in the case of a spherical prescription.

Figure 8:
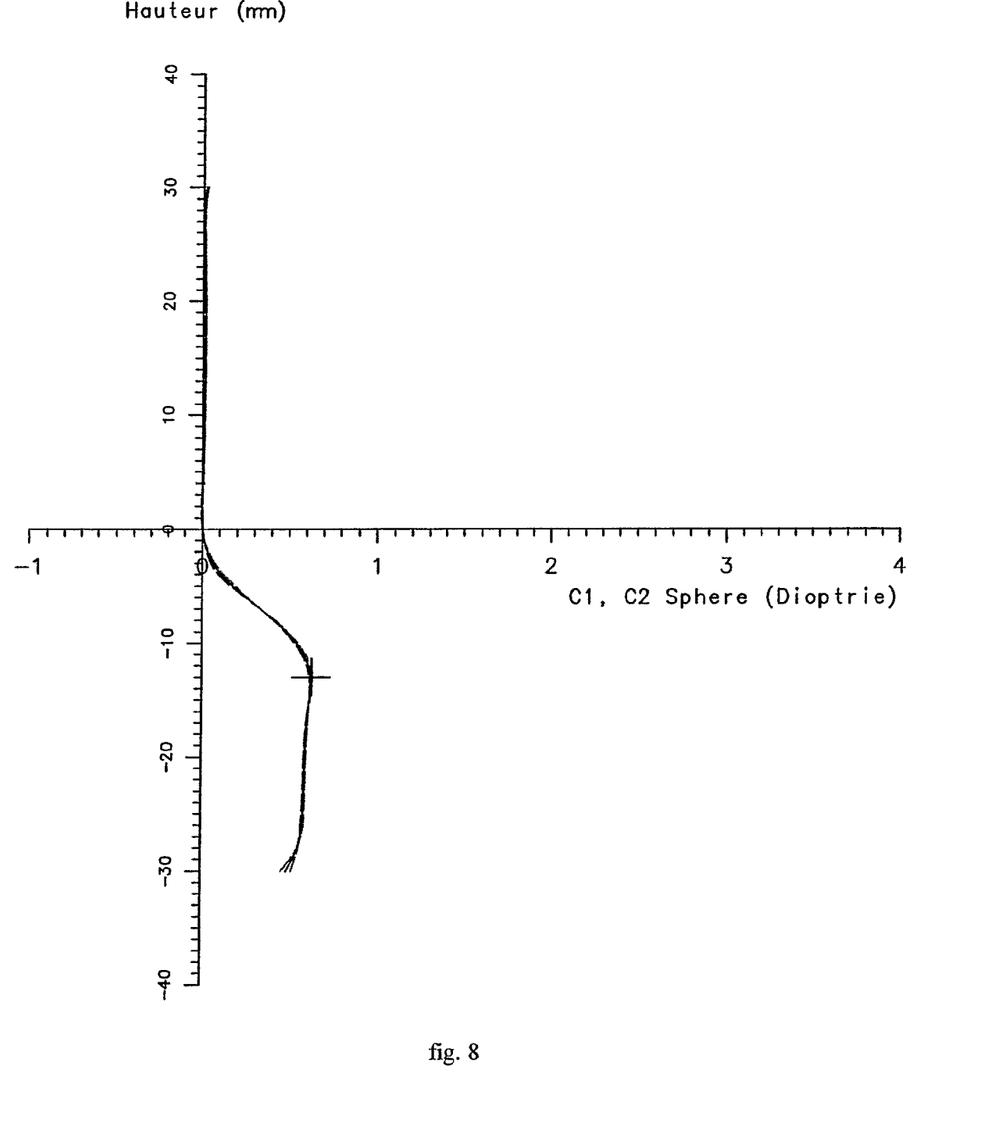
FIGS. 8 to 10, figures similar to FIGS. 5 to 7, for a lens according to a second embodiment of the invention.
Figure 9:
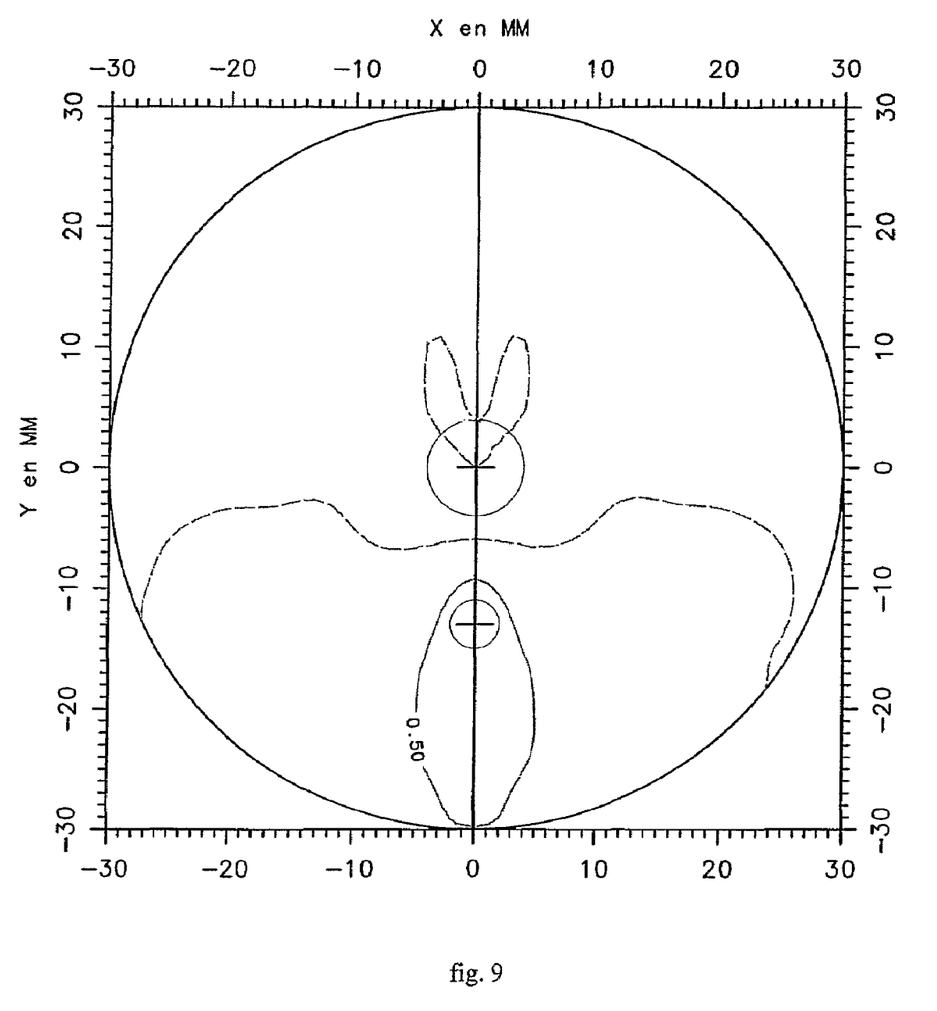
Figure 10:
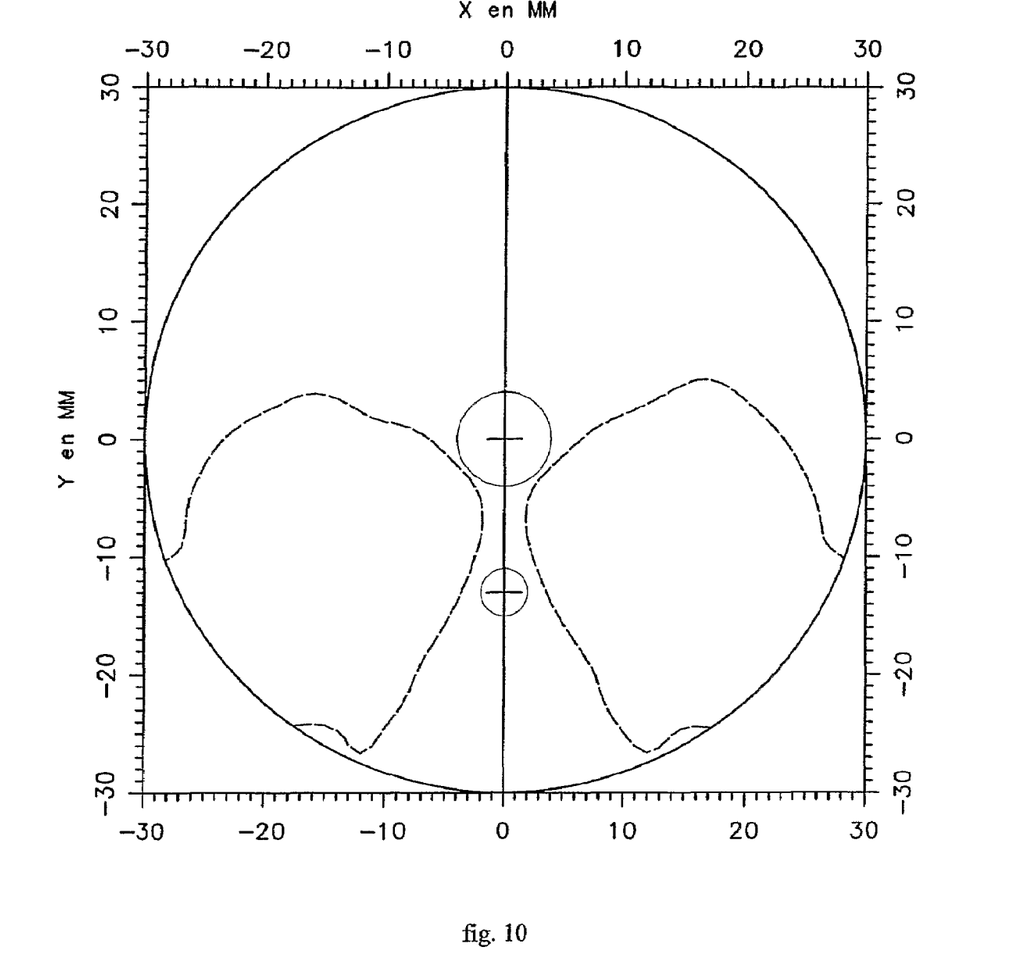

FIGS. 8 to 10 are views similar to those of FIGS. 5 to 7, but for a lens having only a symmetry relative to a vertical axis. FIG. 8 shows the mean sphere on the meridian of the lens, with the same references as FIG. 5. It is noted that the cylinder is substantially nil—less than 0.05 diopters on all of the meridian. Above the geometrical centre of the lens, the origin of the reference, the mean sphere is substantially constant; the mean sphere variation relative to the origin is less than 0.1 diopter; in the example, the maximum variation on the meridian is of the order of 0.05 diopters in the upper part of the lens. The mean sphere progresses when travelling down the meridian reaching a maximum value of the order of 0.6 diopters for a y ordinate of −13 mm; this value corresponds to a lowering of viewing of the order of 26° relative to the direction of viewing in vision at infinity. Below this ordinate value, the mean sphere diminishes slightly, with a variation of less than 0.2 diopters in absolute value. The mean sphere at the origin is 5.20 diopters.

It is possible to consider a progression length, defined by analogy with the progression length of the progressive multifocal lenses. To this end the mean sphere progression along the meridian is considered, which is the difference between the maximum value and the minimal value of the mean sphere. The progression length can then be defined as the height separating the geometrical centre of the lens and a point on the meridian at which the mean sphere is greater than 85% of the progression to the mean sphere at the geometrical centre of the lens. In the example of FIGS. 8 to 10, a mean sphere value of 0.85×0.6 diopters, i.e. 0.51 diopters is reached for a y ordinate of the order of −9 mm. The progression length therefore has a value less than 10 mm.

The graph of FIG. 8 is similar to that of a progressive multifocal lens. However, the sphere variation value is less than the usual values of the sphere variations of the lenses given to presbyopic wearers. The lens of FIGS. 8 to 10 would not be well suited to presbyopic wearers, because of the small value of the mean sphere variation.

FIG. 9 is a map of the mean sphere lines, similar to the map of FIG. 6. It shows the 0.00 diopter isosphere lines—in broken lines around the geometrical centre of the lens, the 0.25 diopter isosphere lines—in broken lines—and the 0.50 diopter isosphere lines—in solid lines. FIG. 9 shows that the mean sphere is less than 0.25 diopters in the upper part of the lens, for y ordinates greater than or equal to −3 mm. The mean sphere reaches 0.50 diopters in the lower part of the lens, for y ordinates below −10 mm, around the meridian. The lens therefore has a small power progression, around the vertical axis and in the lower part of the lens.

FIG. 10 is a map of the cylinder lines, similar to the map of FIG. 7. It shows the two 0.25 diopter isocylinder lines; these lines surround surfaces arranged in the bottom-right and left quadrants of the lens. In the upper part of the lens—for y ordinates greater than 3 mm—the cylinder is less than 0.25 diopters. Along the meridian in the lower part of the lens, the cylinder also remains less than 0.25 diopters. The horizontal distance between the 0.25 diopter isocylinder lines is at least 4 mm, for a y ordinate equal to −8 mm. The distance between the 0.25 diopter isocylinder lines then increases when the y ordinates decrease.

The lens of FIGS. 8 to 10 therefore has in its upper part characteristics close to those of a unifocal lens providing the wearer with a correction equal to the power prescription in far vision. In the lower part of the lens, the power correction increases slightly, within the limit of 0.6 diopters.

The lens is fitted as shown in the example of FIGS. 5 to 7, using the geometrical centre of the lens for the fitting. This solution has the advantage of simplifying the fitting of the lens. It also provides the wearer with a correction suited to far vision, in the upper part of the lens. The fitting also contributes to the small value of the progression length, the lens being fitted "higher" in the frame than a standard progressive multifocal lens. The small progression length is also made possible by the small mean-sphere progression value on the meridian. The wearer therefore enjoys the power addition for a small lowering of the direction of viewing—26° relative to the direction of viewing in far vision, as stated above. For those cases where the lowering is of greater amplitude, the wearer enjoys a vision zone in which the power is stabilized, both on the meridian and beside the meridian.

In either cases, the lens is prescribed taking account of only the far-vision wearer prescription—the wearer not being presbyopic. The lens is therefore fitted in the frame according to the direction of viewing in far vision, without taking account of the power progression in the lower part of the lens. The fitting of the lens therefore requires only a standard measurement of the interpupillary half-distance, as well as a measurement of the height, in order to determine the height at which the geometrical centre of the lens must be placed. The lens is preferably fitted with the axis of symmetry orientated vertically, thus allowing the same lens to be used for the right eye and for the left eye.

The lens of the two examples described above can be obtained by optimization of a surface using optimization methods known per se and described in the documents of the state of the art mentioned above relating to progressive multifocal lenses. For the optimization it is possible to use one or more of the criteria described in the above description with reference to FIGS. 5 to 10, and in particular:

a power progression between 0.50 and 0.75 diopters on the lens; this progression is measured in mean sphere;
 a prescription for esophoric non-presbyopic wearers.

These criteria can be combined with others, in particular with one or more of the criteria proposed in the previous examples.

The choice of some or of all of these criteria makes it possible to obtain a lens by optimization. A person skilled in the art easily understands that the lens in question does not necessarily have values corresponding exactly to the set criteria.

In the above optimization examples, it was proposed to optimize only one of the faces of the lenses. It is clear that in all these examples the role of the front and rear surfaces can be easily switched. The sphere progression can also be allocated to one or the other of the two surfaces of the lens, or partially to one face and the other. The lens can be optimized on one face taking into account surface variables, or also by ray tracing, on two faces taking into account the optical variables.

The invention claimed is:

1. An ophthalmic lens having a prescription for esophoric non-presbyopic wearers and a complex surface, the complex surface having
    a substantially umbilic meridian, and
    a mean-sphere progression greater than or equal to 0.50 diopters and less than 0.75 diopters.

2. The lens of claim 1, having a progression length less than or equal to 11 mm, the progression length being defined as the height on the lens between the optical centre and the point on the meridian at which the mean sphere is greater than 85% of the progression to the mean sphere at the optical centre.

3. The lens of claim 1 or 2, having a maximum mean sphere at a point of the lens corresponding to a 26° lowering of viewing under wearing conditions, relative to the direction of viewing passing through the optical centre.

4. The lens of claim 1, or 2, wherein the meridian is rectilinear.

5. The lens of claim 4, wherein the complex surface is symmetrical relative to the meridian.

6. The lens of claim 5, wherein the complex surface has a second axis of symmetry perpendicular to the meridian.

7. The lens of claim 1 or 2, having a mean sphere which is substantially constant on the meridian above the optical centre.

8. The lens of claim 1 or 2, having a mean sphere which is substantially constant on the meridian below the maximum mean sphere point of the meridian.

9. The lens of claim 7, having a mean sphere which is substantially constant on the meridian below the maximum mean sphere point of the meridian.

10. A visual device for esophoric non-presbyopic wearers comprising at least one ophthalmic lens having a prescription and a complex surface, the complex surface having
    a substantially umbilic meridian, and
    a mean-sphere progression greater than or equal to 0.50 diopters and less than 0.75 diopters.

11. A method for fitting an ophthalmic lens in a visual device prescript to esophoric non-presbyopic wearers, the lens having a complex surface with an optical center, the complex surface having a substantially umbilic meridian and a mean-sphere progression greater than or equal to 0.50 diopters and less than 0.75 diopters, the method comprising:
    measuring the position in the device of the subject's viewing in far vision, and
    fitting of a lens in the device, with the optical centre at the measured position.

* * * * *